March 10, 1959     R. L. BEYERSTEDT     2,876,857
INSTRUMENT PANEL ASSEMBLIES FOR TRACTORS
Filed May 15, 1958     2 Sheets-Sheet 1
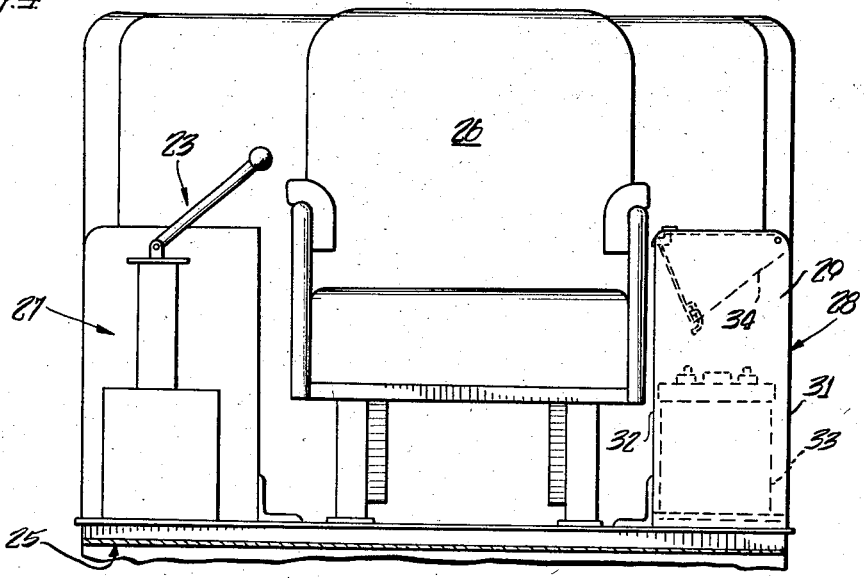
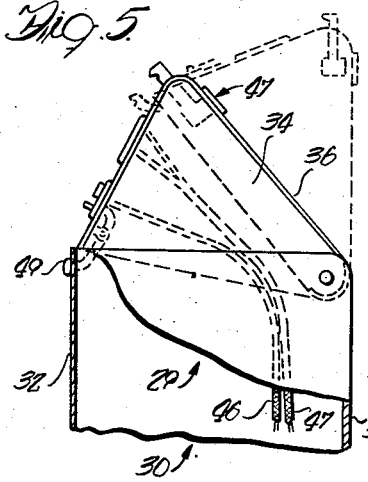
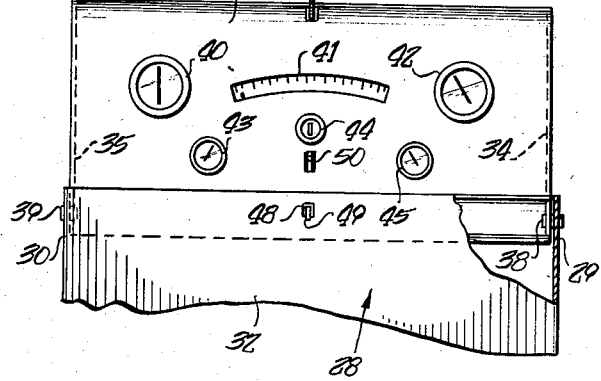
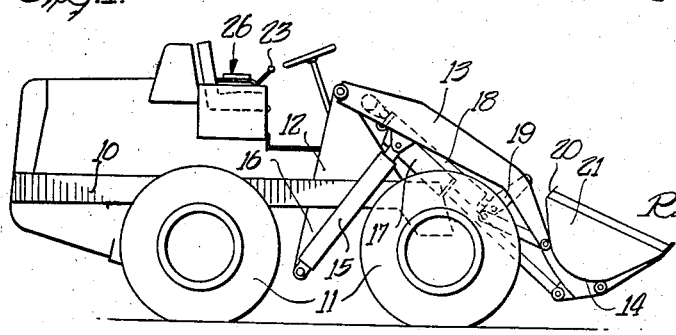
INVENTOR
RALPH L. BEYERSTEDT
Paul O. Pippel
ATTORNEY March 10, 1959  R. L. BEYERSTEDT  2,876,857
INSTRUMENT PANEL ASSEMBLIES FOR TRACTORS
Filed May 15, 1958  2 Sheets-Sheet 2
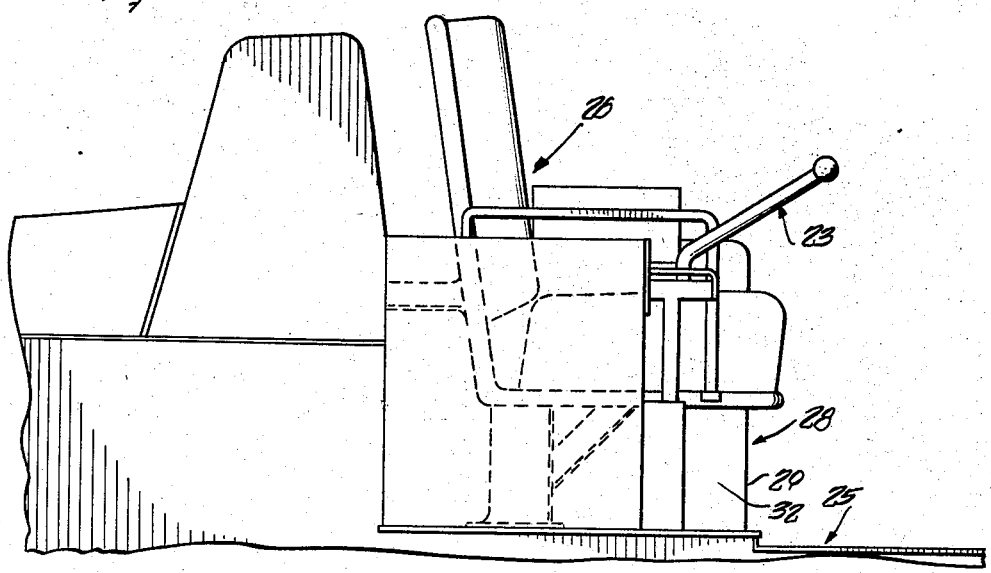
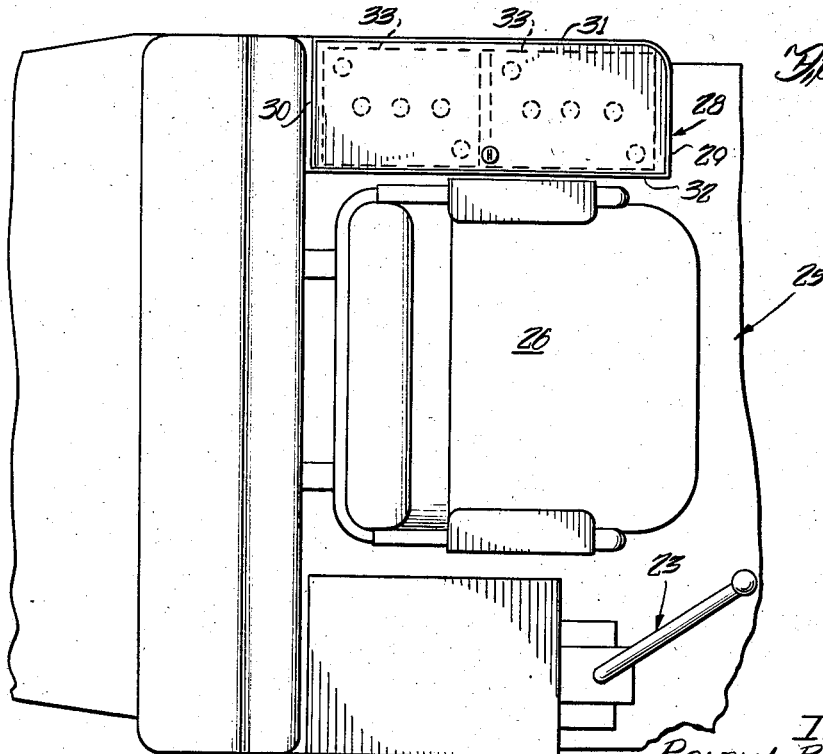
INVENTOR
RALPH L. BEYERSTEDT
Paul O. Pippel
ATTORNEY

United States Patent Office 2,876,857
Patented Mar. 10, 1959

2,876,857

INSTRUMENT PANEL ASSEMBLIES FOR TRACTORS

Ralph L. Beyerstedt, Libertyville, Ill., assignor to The Frank G. Hough Co., a corporation of Illinois Application May 15, 1958, Serial No. 735,572

9 Claims. (Cl. 180—90)

This invention relates generally to motor vehicles and more specifically to an improved storage and instrument panel arrangement for a tractor of the type used in front end tractor loaders.

The tractors used in the construction of tractor loaders used in the material handling or earth-moving art are generally of rather special types. These special types of tractor constructions have developed due to the requirement that the tractor and the loader cooperate to produce a unitary device which will efficiently perform the various operations necessary to properly dig or otherwise work a material. One type of tractor that has found general acceptance in the material handling and earth-moving art is generally characterized as a rear engine mounted rubber-tired tractor. It is to such a type of vehicle that the present invention is directed.

The object of the present invention is to provide an operator's compartment construction for a rear engine mounted tractor wherein means is provided for securing the tractor operating controls against any tampering or unauthorized operation, wherein the instrument panel carrying the operating controls and indicators is conveniently positioned to the operator and may be protected from inclement weather when the tractor is not in use, and additionally, wherein ideal storage of the battery for the vehicle is provided, which storage by virtue of its location and cooperation with the other controls of the tractor further mitigates against and virtually prevents any unauthorized operation of the vehicle.

A further object of the present invention is to provide a tractor construction for a front end type tractor loader, with an instrument panel mounting arrangement which is removed from the forward portion of the operator's compartment, but yet is conveniently located to the operator's position on the tractor.

A further object of the present invention is to provide an instrument panel arrangement cooperating with the battery in a tractor and in combination with an operator's compartment such that the instrument panel and battery are conveniently located on the side of the vehicle adjacent the operator's position in the operator's compartment without interfering with ingress and egress to the operator's compartment.

Other objects and features of the present invention will be apparent upon a perusal of the following specification and drawings in which:

Fig. 1 is a side elevational view of a tractor loader with the tractor thereof constructed according to the present invention;

Fig. 2 is a partial enlarged view of the structure shown in Fig. 1;

Fig. 3 is a top plan view of the structure shown in Fig. 2;

Fig. 4 is a view of the structure shown in Fig. 2 looking toward the rear of the tractor;

Fig. 5 is an enlarged detailed view of a portion of the structure shown in Fig. 4; and Fig. 6 is a partial side elevational view of the structure shown in Fig. 5.

The present embodiment is the preferred embodiment, but it is to be understood that changes can be made in the present embodiment by one skilled in the art without departing from the spirit and scope of the present invention.

Generally it is intended that the present invention be applied to a tractor such as shown in Fig. 1 wherein a frame is supported upon four wheels and carries an operator's compartment thereupon with the forward portion of the operator's compartment being relatively free and uncluttered, with the engine compartment beginning at the rear end of the operator's compartment, with an operator's seat positioned transversely centrally of the compartment, and with box-like compartments formed on each side of the operator's seat. One of these box-like structures extends upwardly to a point adjacent the arm rest of the operator's seat and the battery of the tractor is disposed within the lower portion of this structure. The upper end of the structure is open and a particular instrument panel assembly is pivotally carried thereon and cooperates therewith in a particular manner. When the instrument panel assembly is pivoted downwardly it may be locked with the various instruments and controls disposed within the construction, thereby preventing any tampering with the instrument panel and controls and further preventing the unauthorized use or operation of the tractor. Additionally, the instruments and controls are protected from inclement weather. Because both the battery and the instrument panel are in the same box-like construction and locked therein, it is impossible to jump the battery to provide for operation of the vehicle without using the instrument panel controls. When the instrument panel assembly is raised partially from the construction, it may be locked in this position to expose the instrument panel and controls at an inclined direction at the elbow of the operator of the loader whereby the instrument panel and controls are easily viewed and operated. If the instrument panel assembly is raised further upwardly, easy admittance is gained to the battery for maintenance or removal thereof.

For a detailed description of the present invention reference is made to the drawings. The tractor comprises a frame 10 carried by four-rubber-tired wheels 11. The tractor may be divided longitudinally thereof into three sections, a forward loader mounting section, a center operator's compartment section and a rear engine compartment section. The particular loader structure shown in Fig. 1 is merely an example of one type of suitable loader structure. The loader structure comprises a pair of upstanding plates 12 mounted one on each side of the forward section of the tractor, a boom 13 pivotally connected at its rearward end to the upper end of the plates 12 and extending forwardly of the tractor and pivotally connected thereat to the upper end of a bucket carrier 14, a pair of hydraulic rams such as hydraulic ram 15, each being pivotally connected at the head end thereof to a depending flange 16 and at the rod end thereof to the boom 13 intermediate the ends thereof, a hydraulic ram 17 pivotally carried at the head end thereof on the plates 12 and pivotally connected at the rod end thereof to the bucket carrier 14, a bucket pivotally connected to the bucket carrier 14 at the lower forward end of the bucket carrier 14, and a hydraulic ram 18 pivotally carried at the head end thereof on the boom 13 and pivotally connected at the rod end thereof to a lever 19 intermediate the ends thereof, with the ends of the lever 19 respectively pivotally connected to the boom 13 and a link 20 and with the other end of the link 20 pivotally connected to the bucket 21. When the hydraulic ram 17 is extended and retracted, the bucket carrier 14 is caused to pivot relative to the boom 13. When the hydraulic rams 15 are extended and retracted, the boom 13 is raised and lowered, and when the hydraulic ram 18 is extended and retracted, the bucket 21 is pivoted relative to the bucket carrier 14. Hydraulic fluid conduits, a hydraulic pump and reservoir (not shown), interconnect the hydraulic rams 15, 17 and 18 and the hydraulic control valve assembly 23 for operation of these hydraulic rams by the operator of the loader.

The operator's compartment on the central section of the frame 10 is defined at its rear by the forward portion of the engine compartment, at its bottom by a floor plate 25, the forward end being relatively open whereby the operator may easily observe the operation of the loader mechanism. A seat 26 is disposed within the operator's compartment and mounted on the floor thereof. A box-like container 27 is mounted on the floor 25 of the operator's compartment on the right side of the operator's seat 26. This container 27 may be used as a hydraulic fluid reservoir.

A similar container 28 is mounted on the left side of the operator's seat 26. The container 28 comprises two end walls 29 and 30, and two side walls 31 and 32. The floor 25 of the operator's compartment forms the bottom wall for the container 28. The container 28 is formed as a unitary assembly by some means such as welding so that basically the only entrance to the container 28 is through the open top portion. Suitable small holes through the side or end walls thereof are provided for the passage of cabling and control conduits therethrough to the engine and other instrument panel controlled portions of the tractor. Storage batteries such as storage batteries 33 are disposed within the lower portion of the container 28.

An instrument panel and control assembly is provided for cooperation with the upper portion of the container 28. The instrument panel and control assembly comprises two somewhat triangularly shaped end panels 34 and 35 and a plate 36 joining the side members 34 and 35 together in a spaced apart relationship and extending between two edges of each of the end members 34 and 35. Each end member 34 and 35 is respectively pivotally connected to the end walls 29 and 30 by means of pivotal mounting means 38 and 39. The axis of pivoting of mounting means 38 and 39 is located on the end walls 29 and 30 of the container 28 at the upper and outer marginal edges thereof and on the end walls 34 and 35 of the instrument panel and control assembly adjacent one corner thereof so that when the instrument panel and control assembly is pivoted downwardly one portion of the plate 36 extending between one of the sides of each of the end walls 34 and 35, is positioned substantially horizontally over substantially the entire area of the open upper end of the container 28, as may be seen in Fig. 4, and so that when the instrument panel and control assembly is pivoted through an angle of approximately 45°, the plate 36 is positioned to extend from wall 32 of container 28 in an inclined direction upwardly and laterally outwardly of the tractor to a point above the container 28, and therefrom being inclined in a downwardly and outwardly extending direction to the outer wall 31 of the container 28, as may be seen in Figs. 5 and 6. If the instrument panel and control assembly is pivoted to the dotted line position shown in Fig. 5, a sufficiently large portion of the upper open end of the container 28 is exposed to permit easy access to the interior of the container 28 for maintenance or replacement of the batteries 33. Thus it may be seen that one portion of the plate 36 functions as the instrument panel, while the other portion functions as a cover for the container 28. The indicating instruments 40, 41 and 42 which may be of any type commonly used on tractor loaders, and the controls 43, 44 and 45 which may be of any type generally mounted on these panels are mounted on the instrument panel portion of the plate 36. Cabling or conduits 46 and 47 connect the indicating instruments 40, 41 and 42 and the controls 43, 44 and 45 with the batteries 33 immediately therebelow and through suitable small openings in the walls of the container 28 with the parts of the tractor to be controlled from the instrument panel. If control 44 be the ignition switch and if the starting relays are mounted in the container 28, it may be seen that the engine of the tractor could not be started by the use of a jumper on any portion of the tractor wiring not in the container 28.

A latch and lock arrangement 47 is provided for locking the instrument and control panel within the container 28. The latch portion of the arrangement 47 cooperates with a suitable slot 48 formed through the wall 32 of the container 28. It is of course obvious that when the instrument and control panel is locked within the container 28 as shown in Fig. 4, the batteries 33 and circuitry associated therewith are also locked within the container 28. A simple latch 49 is pivotally carried by the instrument panel and has one end thereof formed to engage the slot 48 in the wall 32 of the container 28 to maintain the instrument panel in the exposed position such as shown in Figs. 5 and 6. The other end of the latch 49 extends outwardly from a slot 50 formed through the instrument panel to provide a convenient means for releasing the latch 49 from the slot 48.

Having described the invention, what is considered new and desired to be protected by Letters Patent is:

1. In a tractor having an operator's compartment, a container fixedly carried in said operator's compartment, the upper end of said container being open, instrument panel and cover means pivotally carried in the open upper end of said container and pivotable to one position to cover said container and seal the instrument panel within said container and to another position to expose said instrument panel in said operator's compartment.

2. In a tractor, an operator's compartment having a seat therein, a container fixedly carried in said operator's compartment on one side of said seat, the upper end of said container being open, instrument panel and cover means pivotally carried in the upper open end of said container and pivotable to one position to cover said container and seal the instrument panel within said container and to another position to expose the instrument panel in the direction of said seat.

3. In a tractor, an operator's compartment having a seat therein, a container fixedly carried in said operator's compartment on one side of said seat, the upper end of said container being open, an instrument panel and a cover formed together as a unitary structure, means pivotally carrying said structure in the open upper end of said container and pivotable to one position wherein said cover is disposed over the open upper end of said container to effectively seal said container with said instrument panel being positioned below said cover within said container and to another position wherein said instrument panel and said cover are positioned to converge toward each other from the upper side marginal edges of said container with said instrument panel being positioned toward said seat.

4. In a tractor, an operator's compartment having a seat therein, a rectangular container fixedly carried in said operator's compartment on one side of said seat, the upper end of said container being open, an L-shaped plate having the end of one leg thereof pivotally connected between the outer upper side marginal walls of said container, said one leg of said L-shaped plate being formed as a cover to effectively selectively seal said container with the other leg of said plate being positioned within said container, said other leg of said L-shaped plate being formed as an instrument panel, and latching means carried at the end of said other leg and cooperable with the upper inner wall of said container to latch said L-shaped plate with the instrument panel disposed toward said seat.

5. In a tractor, an operator's compartment having a seat therein, a rectangular container fixedly carried in said operator's compartment on one side of said seat, the upper end of said container being open, an L-shaped plate having the end of one leg thereof pivotally connected between the outer upper side marginal walls of said container, said one leg of said L-shaped plate being formed as a cover to effectively selectively seal said container with the other leg of said plate being positioned within said container, locking means carried by said one leg of said L-shaped plate and cooperating with latching means on the upper inner wall of said container for locking said cover over the open end of said container, said other leg of said L-shaped plate being formed as an instrument panel, and second latching means carried at the end of said other leg and cooperable with said first latching means to latch said L-shaped plate with the instrument panel disposed toward said seat.

6. In a tractor having an operator's compartment, a container fixedly carried in said operator's compartment, the upper end of said container being open, the lower portion of said container being adapted for carrying tractor storage batteries therein, instrument panel and cover means pivotally carried in the open upper end of said container and pivotable to one position to cover said container and seal the instrument panel and storage batteries within said container, and to another position to expose said instrument panel in said operator's compartment, and to a further position to provide access to said storage batteries.

7. In a tractor, an operator's compartment having a seat therein, a container fixedly carried in said operator's compartment on one side of said seat, the upper end of said container being open, the lower portion of said container being adapted for carrying the tractor storage batteries therein, instrument panel and cover means pivotally carried in the upper open end of said container and pivotable to one position to cover said container and seal the instrument panel and storage batteries within said container, to another position to expose the instrument panel in the direction of said seat, and to a further position to provide free access to the storage batteries.

8. In a tractor, an operator's compartment having a seat therein, a container fixedly carried in said operator's compartment on one side of said seat, the upper end of said container being open, the lower portion of said container adapted for carrying the tractor storage batteries therein, an instrument panel and a cover formed together as a unitary structure, means pivotally carrying said structure in the open upper end of said container and pivotable to one position wherein said cover is disposed over the open upper end of said container to effectively seal said container with said instrument panel being positioned below said cover and above said storage batteries within said container, to another position wherein said instrument panel and said cover are positioned to converge toward each other from the upper side marginal edges of said container with said instrument panel being positioned toward said seat, and to a further position wherein said instrument panel and said cover are positioned away from the open upper end of said container to provide free access to said storage batteries.

9. In a tractor, an operator's compartment having a seat therein, a rectangular container fixedly carried in said operator's compartment on one side of said seat, the upper end of said container being open, the lower portion of said container adapted for carrying the tractor storage batteries therein, an L-shaped plate having the end of one leg thereof pivotally connected between the outer upper side marginal walls of said container, said one leg of said L-shaped plate being formed as a cover to effectively selectively seal said container with the other leg of said plate being positioned within said container above said storage batteries, locking means carried by said one leg and cooperable with latching means carried on the upper inner wall of said container for locking said cover over the open end of said container, said other leg of said L-shaped plate being formed as an instrument panel, and second latching means carried at the end of said other leg and cooperable with said first latching means to latch said L-shaped plate with the instrument panel disposed toward said seat.

No references cited.